(12) United States Patent
Spielman et al.

(10) Patent No.: US 10,746,555 B1
(45) Date of Patent: Aug. 18, 2020

(54) MULTI-MODAL TRANSPORTATION ROUTE DEVIATION DETECTION AND CORRECTION

(71) Applicant: Lyft, Inc., San Francisco, CA (US)

(72) Inventors: Charles Parker Spielman, San Francisco, CA (US); Mayank Gulati, San Francisco, CA (US); Karina Goot, San Fransisco, CA (US)

(73) Assignee: Lyft, Inc., San Francisco, CA (US)

(*) Notice: Subject to any disclaimer, the term of this patent is extended or adjusted under 35 U.S.C. 154(b) by 0 days.

(21) Appl. No.: 16/595,387

(22) Filed: Oct. 7, 2019

(51) Int. Cl.
| | |
|---|---|
| *G08G 1/123* | (2006.01) |
| *G01C 21/34* | (2006.01) |
| *G06Q 10/04* | (2012.01) |
| *G06Q 30/02* | (2012.01) |
| *G06Q 10/02* | (2012.01) |
| *G06Q 10/06* | (2012.01) |
| *G06Q 50/30* | (2012.01) |

(52) U.S. Cl.
CPC ..... *G01C 21/3415* (2013.01); *G01C 21/3438* (2013.01); *G01C 21/3453* (2013.01); *G06Q 10/02* (2013.01); *G06Q 10/047* (2013.01); *G06Q 10/063* (2013.01); *G06Q 30/0284* (2013.01); *G06Q 50/30* (2013.01)

(58) Field of Classification Search
CPC ............ G01C 21/3415; G01C 21/3438; G01C 21/3453; G06Q 10/02; G06Q 10/047; G06Q 50/30; G06Q 10/063; G06Q 30/0284; G08G 1/123
USPC .................. 701/533, 400, 408, 538; 709/217
See application file for complete search history.

(56) References Cited

U.S. PATENT DOCUMENTS

| | | | | |
|---|---|---|---|---|
| 9,679,487 | B1* | 6/2017 | Hayward | G01S 19/50 |
| 9,752,890 | B2* | 9/2017 | Meisels | G01C 21/3476 |
| 2009/0271109 | A1* | 10/2009 | Lee | G01C 21/20 |
| | | | | 701/532 |
| 2009/0319163 | A1* | 12/2009 | Sutter | G08G 1/207 |
| | | | | 701/117 |
| 2012/0173134 | A1* | 7/2012 | Gutman | G01C 21/3476 |
| | | | | 701/400 |
| 2012/0173135 | A1* | 7/2012 | Gutman | G01C 21/3469 |
| | | | | 701/408 |
| 2015/0032366 | A1* | 1/2015 | Man | H04W 4/024 |
| | | | | 701/412 |
| 2016/0076905 | A1* | 3/2016 | Broadbent | G01C 21/3691 |
| | | | | 701/414 |

(Continued)

*Primary Examiner* — Shardul D Patel
(74) *Attorney, Agent, or Firm* — K&L Gates LLP

(57) ABSTRACT

Methods and systems for detecting when users deviate from a provided transportation route and for correcting the transportation route in response to such user deviations is presented. In one embodiment, a method is provided including detecting a changed condition for a transportation route between a first location and a second location. The transportation route may include multiple transportation segments. A first transportation segment designating a first modality may be identified, wherein the changed condition decreases a likelihood that vehicles associated with the first modality will be available to service the first transportation segment. In response, a second transportation segment designating a second modality different from the first modality is generated. The first transportation segment is then replaced with the second transportation segment in the transportation route.

20 Claims, 6 Drawing Sheets

(56) References Cited

U.S. PATENT DOCUMENTS

| | | | | |
|---|---|---|---|---|
| 2016/0320194 A1* | 11/2016 | Liu | ............... | G01C 21/3423 |
| 2017/0357914 A1* | 12/2017 | Tulabandhula | ....... | H04W 4/025 |
| 2018/0051995 A1* | 2/2018 | Delling | .............. | G01C 21/3415 |
| 2018/0052002 A1* | 2/2018 | Delling | ............ | G08G 1/096838 |
| 2019/0056233 A1* | 2/2019 | Liu | ............... | G01C 21/3484 |
| 2019/0236743 A1* | 8/2019 | Bonanni, III | ........ | G06Q 20/127 |
| 2019/0301891 A1* | 10/2019 | Rowitch | ............ | G01C 21/3415 |

\* cited by examiner

US 10,746,555 B1

MULTI-MODAL TRANSPORTATION ROUTE DEVIATION DETECTION AND CORRECTION

BACKGROUND

Individuals desiring transportation (e.g., transportation by vehicle) between two locations can submit transportation requests to transportation providers. In particular, users may identify specific locations between which transportation is desired. In response, transportation providers may identify multiple modes of transportation that may be used to transport the user between the identified locations.

SUMMARY

The present disclosure presents new and innovative systems and method for generating multi-modal transportation routes. In a first aspect, a system is provided comprising a processor and a memory. The memory may store instructions which, when executed by the processor, cause the processor to (a) detect a changed condition for a current route from an origin location to a destination location, wherein the current route includes segments and is associated with a mobile device of a user and (b) identify a first segment from the segments, the first segment being associated with a first modality, wherein the changed condition decreases a likelihood that the segments for the current route will be completed. The memory may store further instructions which, when executed by the processor, cause the processor to (c) determine, in response to the changed condition, a second segment, wherein the second segment is associated with a second modality and (d) send, to the mobile device associated with the user, a corrected route, wherein the corrected route replaces the first segment with the second segment.

In a second aspect according to the first aspect, the memory stores further instructions which, when executed by the processor while performing (a), cause the processor to detect that a current location of the mobile device differs from an expected location for the mobile device.

In a third aspect according to the any of the first and/or second aspects the memory stores further instructions which, when executed by the processor while performing (a) cause the processor to detect a reduced availability for vehicles associated with the first modality.

In a fourth aspect according to any of the first through third aspects, the memory stores further instructions which, when executed by the processor while performing (a) cause the processor to detect a change in an estimated time of completion of a current segment of the segments.

In a fifth aspect according to any of the first through fourth aspects, the memory stores further instructions which, when executed by the processor while performing (c) cause the processor to analyze locations of vehicles associated with the second modality and identify a vehicle associated with the second modality with a location near a starting location of the second segment.

In a sixth aspect according to any of the first through fifth aspects, the first segment includes a first starting location and a first ending location. The second segment may include at least one of (i) a second starting location different from the first starting location and (ii) a second ending location different from the first ending location.

In a seventh aspect according to any of the first through sixth aspects, the memory stores further instructions which, when executed by the processor while performing (b) cause the processor to identify, based on the changed condition, multiple segments from multiple routes designating the first modality. The memory may store still further instructions which, when executed by the processor while performing (c) cause the processor to determine a third segment designating a third modality different from the first modality and the second modality. The corrected route may also replace the first segment with the second segment and the third segment.

In an eighth aspect, a method is provided comprising (a) detecting a changed condition for a current route from an origin location to a destination location, wherein the current route includes segments and is associated with a mobile device of a user and (b) identifying a first segment from the segments, the first segment being associated with a first modality, wherein the changed condition decreases a likelihood that the segments for the current route will be completed. The method may further include (c) determining, in response to the changed condition, a second segment, wherein the second segment is associated with a second modality and (d) sending, to the mobile device associated with the user, a corrected route, wherein the corrected route replaces the first segment with the second segment.

In a ninth aspect according to the eighth aspect, (a) further comprises detecting that a current location of the mobile device differs from an expected location for the mobile device.

In a tenth aspect according to any of the eighth and/or ninth aspects, (a) further comprises detecting a reduced availability for vehicles associated with the first modality.

In an eleventh aspect according to any of the eighth through tenth aspects, (a) further comprises detecting a change in an estimated time of completion of a current segment of the segments.

In a twelfth aspect according to any of the eighth through eleventh aspects, (c) further comprises analyzing locations of vehicles associated with the second modality and identifying a vehicle associated with the second modality with a location near a starting location of the second segment.

In a thirteenth aspect according to any of the eighth through twelfth aspects, the first segment includes a first starting location and a first ending location. The second segment may include at least one of (i) a second starting location different from the first starting location and (ii) a second ending location different from the first ending location.

In a fourteenth aspect according to any of the eighth through thirteenth aspects, (b) further comprises identifying, based on the changed condition, multiple segments from multiple routes designating the first modality. In such aspects, (c) may further comprise determining a third segment designating a third modality different from the first modality and the second modality. The corrected route may also replace the first segment with the second segment and the third segment.

In a fifteenth aspect, a non-transitory, computer-readable medium is provided storing instructions which, when executed by a processor, cause the processor to (a) detect a changed condition for a current route from an origin location to a destination location, wherein the current route includes segments and is associated with a mobile device of a user and (b) identify a first segment from the segments, the first segment being associated with a first modality, wherein the changed condition decreases a likelihood that the segments for the current route will be completed. The non-transitory, computer-readable medium may store further instructions which, when executed by the processor, cause the processor to (c) determine, in response to the changed condition, a second segment, wherein the second segment is associated with a second modality and (d) send, to the mobile device associated with the user, a corrected route, wherein the corrected route replaces the first segment with the second segment.

In a sixteenth aspect according to the fifteenth aspect, the non-transitory, computer-readable medium stores further instructions which, when executed by the processor while performing (a), cause the processor to detect that a current location of the mobile device differs from an expected location for the mobile device.

In a seventeenth aspect according to any of the fifteenth and/or sixteenth aspects the non-transitory, computer-readable medium stores further instructions which, when executed by the processor while performing (a) cause the processor to detect a reduced availability for vehicles associated with the first modality.

In an eighteenth aspect according to any of the fifteenth through seventeenth aspects, the non-transitory, computer-readable medium stores further instructions which, when executed by the processor while performing (a) cause the processor to detect a change in an estimated time of completion of a current segment of the segments.

In a nineteenth aspect according to any of the fifteenth through eighteenth aspects, the non-transitory, computer-readable medium stores further instructions which, when executed by the processor while performing (c) cause the processor to analyze locations of vehicles associated with the second modality and identify a vehicle associated with the second modality with a location near a starting location of the second segment.

In a twentieth aspect according to any of the fifteenth through nineteenth aspects, the non-transitory, computer-readable medium stores further instructions which, when executed by the processor while performing (b) cause the processor to identify, based on the changed condition, multiple segments from multiple routes designating the first modality. The non-transitory, computer-readable medium may store further instructions which, when executed by the processor while performing (c), cause the processor to determine a third segment designating a third modality different from the first modality and the second modality. The corrected route may also replace the first segment with the second segment and the third segment.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Figure 1A:
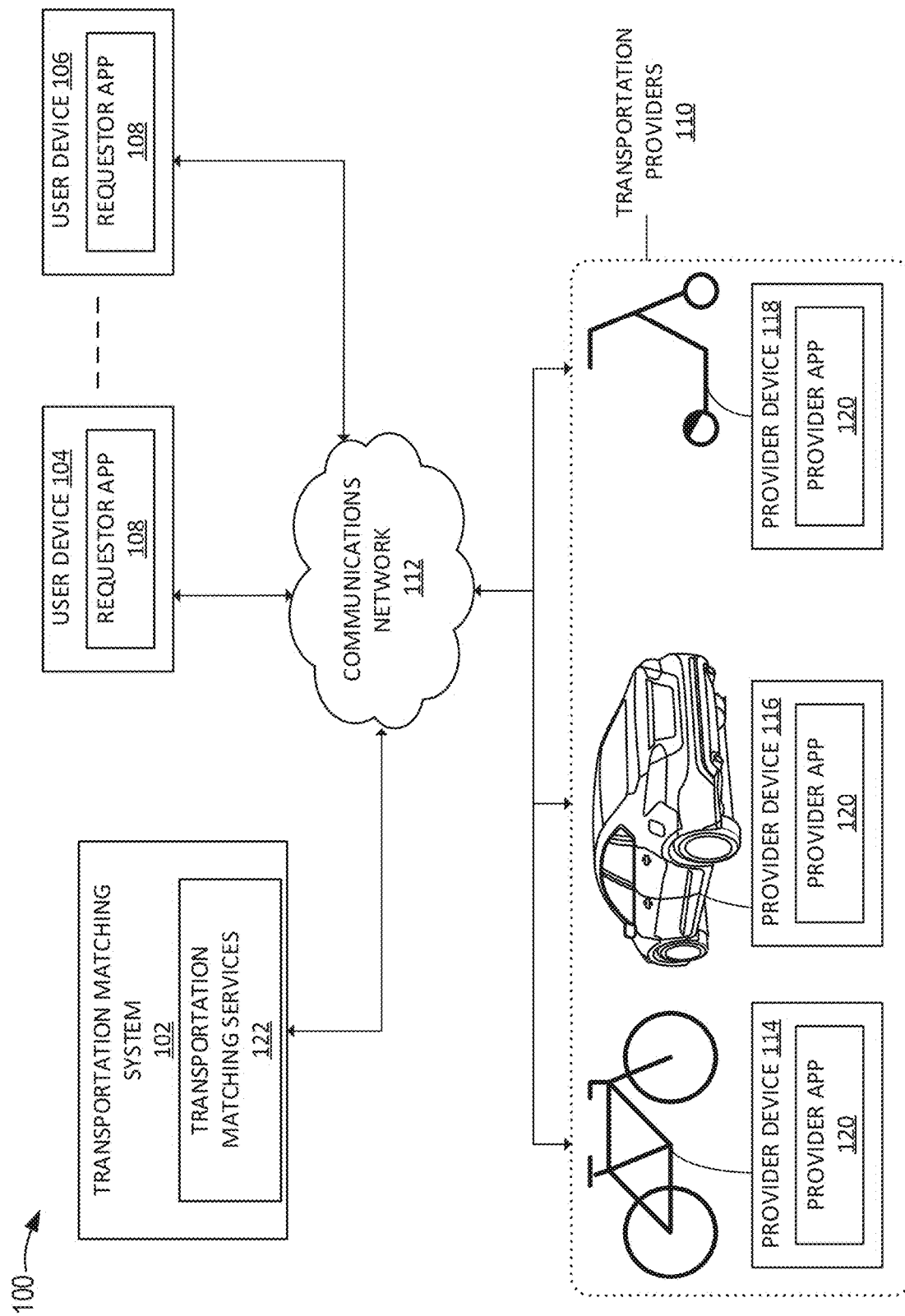
FIG. 1A illustrates a transportation matching system according to exemplary embodiments of the present disclosure.

Aspects of the present disclosure involve systems and methods for detecting when users deviate from a provided transportation route and for correcting the transportation route in response to such user deviations. Techniques related to those discussed in the present disclosure are also discussed in (i) U.S. application Ser. No. 16/595,399, filed on Oct. 7, 2019, and titled "MULTI-MODAL TRANSPORTATION PROPOSAL GENERATION," (ii) U.S. application Ser. No. 16/595,429, filed on Oct. 7, 2019, and titled "TRANSPORTATION PROPOSAL FILTRATION, COMPARISON, AND INCONVENIENCE MEASUREMENT," and (iii) U.S. application Ser. No. 16/595,384, filed on Oct. 7, 2019, and titled "TRANSPORTATION ROUTE PLANNING AND CORRECTION".

Various processes and systems currently exist for determining transportation proposals that identify transportation routes between two locations, such as an origin location and a destination location. For example, many transportation providers use such processes and systems to provision vehicles for transporting users from a first, starting location, to a second, ending location. Transportation providers may include transportation networking companies (TNCs). TNCs may implement a transportation system that matches transportation requests with a dynamic transportation network of vehicles. In certain instances, the vehicles may include road-going vehicles and/or personal mobility vehicles. In some examples, some of the vehicles may be standard commercially available vehicles and some of the vehicles may be owned and/or operated by individuals. In some implementations, the vehicles may additionally or alternatively be autonomous (or partly autonomous). Accordingly, throughout the instant disclosure, references to a "vehicle operator" (or an "operator") may, where appropriate, refer to a human driving a vehicle, an autonomous vehicle control system, an autonomous vehicle, an owner of an autonomous vehicle, an operator of an autonomous vehicle, an attendant of an autonomous vehicle, a requesting user piloting a vehicle, and/or an autonomous system for piloting a vehicle. In one example, the TNC may implement multiple transportation systems, where each transportation system is responsible for coordinating transportation matching for a specific geographic region or set number of vehicles.

The transportation system may communicate with computing devices associated with the vehicles in the network, which may be separate computing devices and/or may be computing devices that are integrated into the respective vehicles. In some examples, one or more of the computing devices may be mobile devices, such as a smart phone. Additionally or alternatively, one or more of the computing devices may be tablet computers, personal digital assistants, or any other type or form of mobile computing device. Additionally, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or an operator for a transportation matching application, a navigation application, and/or any other application suited for use by requestors and/or operators). Additionally or alternatively, one or more of the computing devices may be devices suitable for installing in a vehicle and/or may be a vehicle's computer that has a transportation management system application installed on the computer to provide transportation services to transportation requestors and/or communicate with the transportation system.

FIG. 1A illustrates an example system 100 for matching transportation requests to a network of transportation vehicles according to one embodiment of the present disclosure. As illustrated, a transportation matching system 102 may communicate with user devices 104-106 requesting transportation. In some examples, the user devices 104-106 requesting transportation may include a requestor app 108 implemented by the transportation provider. The requestor app 108 may represent any application, program, and/or module that may provide one or more services related to requesting transportation services. For example, the requestor app 108 may include a transportation matching application for requestors. In some examples, the requestor app may match the user of the requestor app 108 (e.g., a transportation requestor) with transportation providers 110 through communication with the transportation matching system 102 via the communications network 112. In addition, the requestor app 108 may provide the transportation matching system 102 with information about a requestor (including, e.g., the current location of the requestor) to enable the transportation matching system 102 to provide dynamic transportation matching services for the requestor and one or more transportation providers 110, each of which may include a provider device 114, 116, 118. Each provider device 114, 116, 118 may include a provider app 120, which may be any application program and/or set of instructions that may provide one or more services related to operating a vehicle and/or providing transportation matching services in conjunction with the transportation matching system 102 and the requestor app 108.

In some examples, the requestor app 108 may coordinate communications and/or a payment between a requestor and a transportation provider 110. According to some embodiments, the requestor app 108 may provide a map service, a navigation service, a traffic notification service, and/or a geolocation service. The provider app 120 may provide similar functions. In other implementations, the requestor app 108 may allow users to request access to certain vehicles, such as personal mobility vehicles (e.g., bikes and/or scooters).

The transportation matching system 102 may arrange transportation on an on-demand and/or ad-hoc basis by, e.g., matching one or more transportation requestors with one or more transportation providers 110. For example, the transportation matching system 102 may provide one or more transportation matching services 122 for a networked transportation service, a ridesourcing service, a taxicab service, a automobile-booking service, an autonomous vehicle service, a personal mobility vehicle service, or some combination and/or derivative thereof. The transportation matching system 102 may include and/or interface with any of a variety of subsystems that may implement, support, and/or improve the transportation matching services 122. For example, the transportation matching services 122 may include or otherwise interface with a matching system (e.g., that matches requestors to ride opportunities and/or that arranges for requestors and/or providers to meet), a mapping system, a routing system (e.g., to help a provider reach a requestor, to help a requestor reach a provider, and/or to help a provider reach a destination), a rating system (e.g., to rate and/or gauge the trustworthiness of a requestor and/or a provider), a payment system, and/or an autonomous or semi-autonomous driving system. The transportation matching system 102 may be implemented on various platforms, including a requestor-owned mobile device, a computing system installed in a vehicle, a server computer system, or any other hardware platform capable of providing transportation matching services to one or more requestors and/or providers.

Figure 1B:
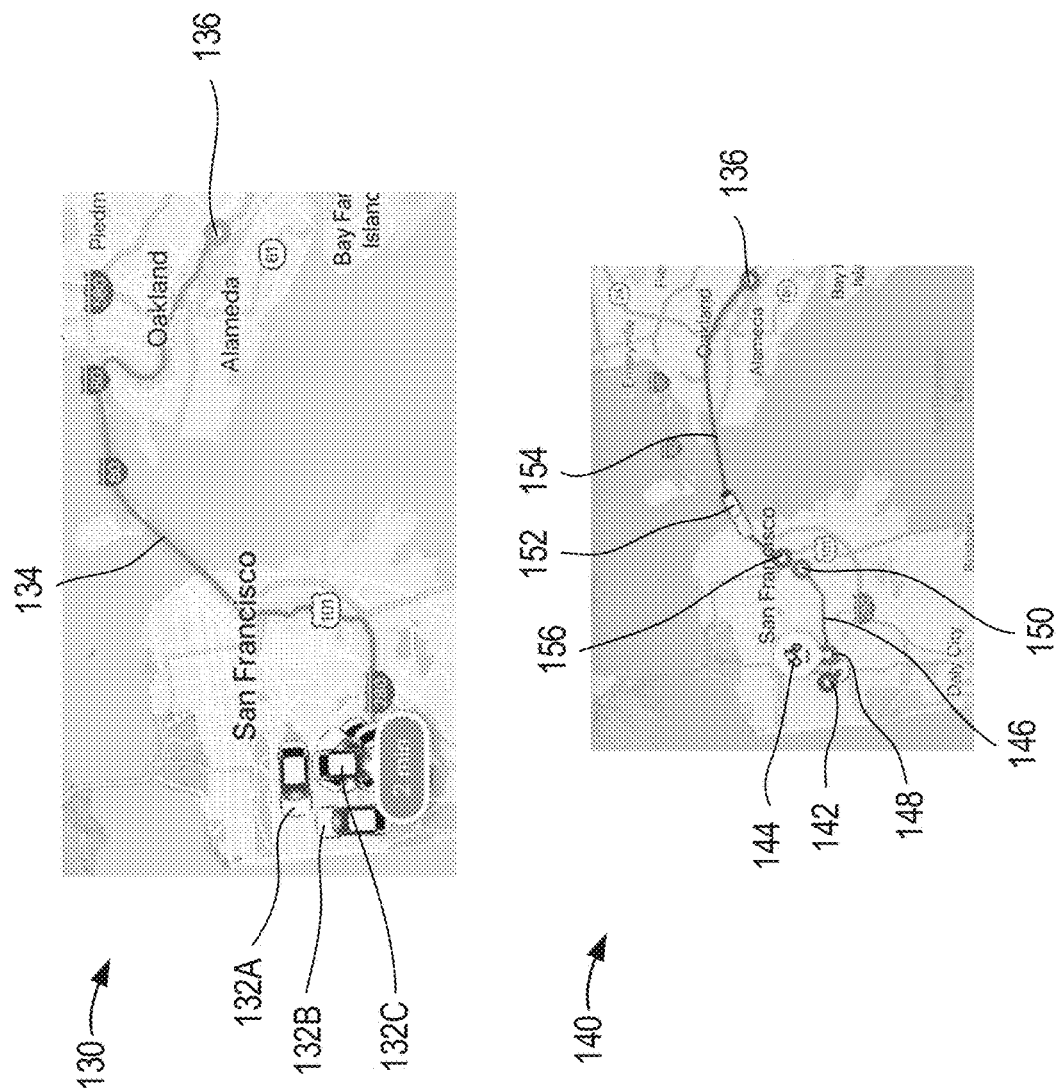
FIG. 1B illustrates transportation routes according to exemplary embodiments of the present disclosure.

Existing transportation matching systems are typically configured to identify and provide a particular modality of transportation between starting and ending locations. For example, FIG. 1B depicts a transportation route 130 identifying a particular modality of transportation between a starting location (not labelled) and an ending location 136. The transportation route 130 includes a single transportation segment 134 between the starting location and the ending location 136. The transportation segment 134, as generated, is to be serviced by one of the automobiles 132A-C. For example, a user requesting transportation from the starting location to the ending location 136 may be picked up by one of the automobiles 132A-C and driven along the route indicated by the transportation segment 134 to the ending location 136.

In certain implementations, the transportation matching system may analyze and/or recommend transportation routes using modalities other than automobiles. For example, where the starting location and ending location 136 are closer together (e.g., shorter rides), the transportation matching system may generate transportation routes that utilize a personal mobility vehicle (e.g., a bike or a scooter). As another example, the transportation matching system may determine that a given starting location and/or ending location 136 are near transit stops for public transportation systems. In such a scenario, the transportation matching system may generate a transportation route from the starting location that utilizes a public transportation modality (e.g., a bus or a train).

Typical transportation matching systems, however, may not be able to generate transportation routes that combine multiple modalities into a single transportation proposal. Therefore, such transportation matching systems cannot capture cost or time savings associated with combining multiple modalities into a single transportation proposal. For example, in certain instances (e.g., during rush hour traffic), automobile-based modalities may be comparatively slower than other modalities, such as bikes or scooters. As another example, during rush hour or periods of high road congestion, it may be faster to take the train (i.e., use a public transit modality) between the two locations rather than to drive (i.e., use a automobile modality) between the two locations. In such a scenario, existing transportation matching systems may recommend public transportation modalities between starting and ending locations for users located near transit stops. But such a recommendation may not be useful for all users. For instance, users that are not in close proximity to a transit stop may have to walk long distances over a significant amount of time to access the transit stop from their starting location. Alternatively, such users may have to walk long distances over a significant amount of time to leave a transit stop and arrive at their ending location. In either scenario, using public transportation may be slower than traveling by automobile. Such users may therefore be recommended transportation routes using automobiles, such as the automobiles 132A-C.

Nevertheless, even users located far away from public transportation may receive faster transportation if they were able to use other modalities for transportation to the transit stops. For example, FIG. 1B also depicts a transportation route 140 for transportation between starting location 142, which corresponds to the starting location of the transportation route 130, and ending location 136. Rather than fulfilling the entire transportation route 140 with a single modality as in the transportation route 130, the transportation route 140 includes two transportation segments 146, 154 fulfilled by two different modalities (e.g., two different types of vehicles 144, 152). In particular, transportation segment 146 is fulfilled by bike 144 and transportation segment 154 is fulfilled by train 152. While following the transportation route 140, a user may walk from starting location 142 to location 148 at the beginning of the transportation segment 146 and pick up a bike 144 (e.g., a docked or dockless bike available for short term rental and/or use). The user can then ride the bike 144 from the location 148 to the location 150 at the end of the transportation segment 146 and drop off the bike 144 (e.g., at a bike dock or bike rack) before walking to location 156 at the start of segment 154. The location 156 may correspond to a transit station (e.g., a train station), and the user may board the train 152 for transportation to the ending location 136 at the end of the segment 154.

By generating transportation routes with multiple modalities, the transportation matching system may combine the benefits of each type of modality. For example, bikes, scooters, and/or walking may be optimal for traveling short or medium distances (e.g., first-mile and last-mile legs of multi-modal transportation proposals), while automobiles and trains may be better for longer distances. Similarly, automobiles may be more flexible in scheduling and routing, but may be more expensive, while trains and buses may be less flexible but also less expensive. By combining any one of these modalities into a single transportation proposal, transportation routes such as the transportation route 140 may capitalize on the relative benefits of each type of modality. For example, during rush hour or periods of high road congestion, the transportation route 140 may be able to allow more users to quickly and conveniently access faster and less expensive transportation via trains 152 (in comparison to automobiles). In another example, transportation by automobile may be faster and easier if disparate passengers meet at a common pick-up location, or if new passengers travel to pick-up locations closer to an existing route for an operator. In such instances, transportation proposals can be generated that identify transportation routes that guide users to use personal mobility vehicles for transportation to such pick-up locations.

Therefore, there exists a need to generate transportation routes that utilize different modalities. Additionally, once generated, transportation routes that utilize different modalities may have to account for changed circumstances related to one or more of the modalities. For example, a change in one modality (e.g., delay, change in availability) of a transportation route may make it less likely that other modalities can be successfully utilized (e.g., a user may miss a subsequent train, or the availability of personal mobility vehicles may be insufficient) later in the transportation route. Therefore, systems are required to detect and account for changes to transportation routes with different modalities and to do so in real time, which can be complex and challenging. One way to solve this problem is to track transportation routes that are in progress to detect changed conditions along the transportation routes and/or along segments of the transportation routes. Later segments of the transportation route whose successful completion are compromised may be identified and new segments of the transportation route that utilize new modalities, or that follow a different route, may be generated. These segments may then replace segments that are compromised by the changed condition.

Figure 2:
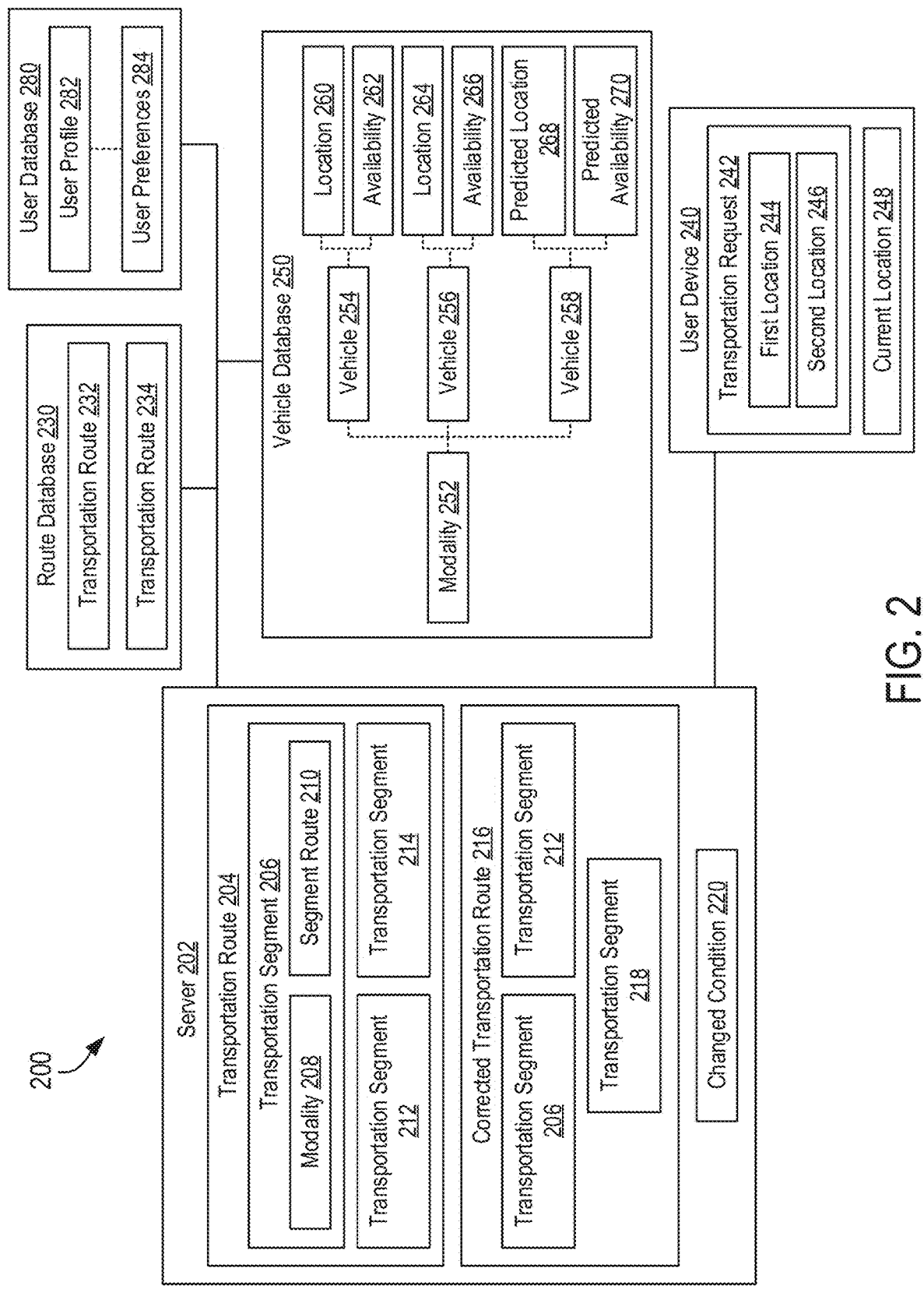
FIG. 2 illustrates a system according to an exemplary embodiment of the present disclosure.

FIG. 2 illustrates a system 200 according to an exemplary embodiment of the present disclosure. The system 200 includes a server 202, a user device 240, a vehicle database 250, a route database 230, and a user database 280. The server 202 may be configured to generate and monitor transportation routes 204 in response to transportation requests. For example, the server 202 may receive transportation requests 242 from user devices 240 requesting transportation from a first location 244 to a second location 246 (e.g., in connection with implementing a dynamic transportation network and/or a transportation matching system). The user devices 240 may include a computing device such as one or more of a smartphone, laptop, tablet computer, and/or wearable computing device. In response to receiving the transportation request 242, the server 202 may generate the transportation route 204. The transportation route 204 may include one or more transportation segments 206, 216, 218. The transportation segment 206 includes a modality 208 identifying a type of transportation for the transportation segment 206. The transportation segment 206 also includes a segment route 210 indicating an expected route of a user while following the transportation segment 206 (e.g., a route from a starting location of the transportation segment 206 to an ending location of the transportation segment 206). For example, where the modality 208 is transportation by scooter, the segment route 210 may indicate an expected route the user will take (i.e., scooter) according to the transportation segment 206. Although not depicted, transportation segments 212, 214 may also include associated modalities and segment routes. The transportation segments 206, 212, 214 may be serviced by two or more different modalities 208. For example, the transportation segment 206 may correspond to transportation by personal mobility vehicle (e.g., bike and/or scooter), the transportation segment 216 may correspond to transportation by train, and the transportation segment 218 may correspond to transportation by walking. Other modalities may also include transportation by automobile and/or transportation by bus. Transportation by automobile may include transportation provided by an autonomously-operated automobile, semi-autonomously-operated automobile and/or an automobile operated by an operator such as a operator associated with a TNC. In implementations where the automobile is autonomously or semi-autonomously operated, the automobile may be limited in locations at which it can pick up and/or drop off users (e.g., may be restricted to specific pick-up/drop-off locations and/or zones). Additionally, transportation by automobile may include different types of transportation provided by the automobile. For example, transportation by automobile may include transportation by an independent automobile that fulfills a single request (e.g., a single request identifying an individual and/or a group of people associated with a single request). As another example, transportation by automobile may include transportation by a shared automobile that fulfills multiple request (e.g., the automobile may pick up and/or drop off users while transporting other users).

In some instances, the server 202 may monitor transportation routes 204 that are in progress for changed condition(s) 220 indicating changes in transportation routes, modality availability, marketplace condition changes, and/or the like. For example, after a user associated with a user device 240 accepts and begins a transportation route 204, the server 202 may monitor performance of the transportation route 204. The changed condition 220 may indicate that vehicles associated with the modality 208 of one of the transportation segments 206, 212, 214 are not available or are unlikely to be available to fulfill subsequent transportation segments. For example, transportation segment 206 may correspond to transportation by walking and transportation segment 212 may correspond to transportation by scooter. While a user is walking along the segment route 210 to access a scooter for use with transportation segment 212, a changed condition 220 may cause the scooter to become unavailable or less likely to be available. For example, the server 202 may determine that another user has accessed the scooter. As another example, the server 202 may determine that another, different user is also walking towards the scooter and the different user may arrive at the scooter before the user associated with the user device 240. For example, the server 202 may identify two transportation routes that include transportation segments directing different users to walk to the same scooter. In such an instance, the server 202 may compare the estimated times of arrival for the users and may determine a changed condition 220 for the transportation route associated with the user expected to arrive later to the scooter (e.g., after the scooter has already been accessed). In implementations where there are multiple vehicles of the same modality in a given location or area, the server 202 may compare an expected future demand for the vehicles to an expected future availability of the vehicles. In certain instances, the server 202 may identify multiple transportation routes corresponding to different users that each have at least one overlapping transportation segment (e.g., a transportation segment with the same modality and beginning or ending at a similar location to one or more transportation segments of other transportation routes. For example, multiple users may be on a train according to a current transportation segment (e.g., transportation segment 212), intending to disembark the train at a transit stop and board a scooter according to a subsequent transportation segment (e.g., transportation segment 214). The server 202 may compare the expected future demand indicated by the overlapping transportation segments to determine that more users are intending to access a scooter at the transit stop than there are scooters likely to be available at the transit stop according to the expected future availability of the scooters (e.g., because more scooters were used by preceding users). Accordingly, the changed condition 220 may be indicative of insufficient scooters being available to fulfill the subsequent transactions.

In response identifying changed conditions, the server 202 may generate a corrected transportation route 216 that replaces any transportation segments that are no longer likely to be successfully completed by a user, due to the changed condition 220. For example, the corrected transportation route 216 may be generated to replace portions of the transportation route 204 that are compromised by the changed condition 220. In particular, the server 202 may replace a transportation segment 214 that is compromised by the changed condition 220 with a transportation segment 218 that is not compromised by the changed condition 220. In some implementations, transportation segments 218 that are newly-included in the corrected transportation route 216 may be generated to utilize a different modality than the transportation segment 214 that is compromised by the changed condition 220. For example, where the transportation segments 214 is transportation by scooter and the changed condition is a lack of availability of scooters, the transportation segment 218 may be generated to designate transportation by bike or transportation by automobile. For example, the server 202 may generate new transportation segments providing transportation by bike for users with closer destinations and may generate new transportation segments providing transportation by automobile for users with further destinations.

In additional or alternative implementations, the transportation segment 218 may be generated to utilize a different route. For example, the changed condition 220 may indicate that a user has deviated from a segment route 210 of a transportation segment 206 that is currently in progress, e.g., by receiving a current location 248 from the user device 240 associated with the user and comparing the current location 248 to the segment route 210. In particular, the segment route 210 may expect the user to walk to a first transit stop to board a train. In such instances, the current location 248 may instead be closer to a second transit stop. In response, the transportation segment 218 may be generated to instead indicate that the user board a train at the second transit stop (e.g., on the same train line or on a different train line) and ride the train to a same or different location. The newly-generated transportation segment 218 may then replace the transportation segment 212 indicating that the user ride the train from the second transit stop. The server 202 may also generate a new transportation segment to replace the transportation segment 206 with a transportation segment that directs the user to walk to the second transit stop.

In certain implementations, the changed condition 220 may compromise the successful completion of more than one transportation segment 206, 212, 214 of a transportation route 204. In such instances, the corrected transportation route 216 may be generated to include one or more transportation segments 218 replacing any transportation segments 206, 212, 214 that are compromised. Also, in certain instances, a single transportation segment 218 may be generated to replace more than one transportation segment 206, 212, 214 that is compromised. For example, after disembarking a train, the transportation route may include transportation segments 212, 214 corresponding to transportation by bike to a bike dock location and transportation by walking to a user's final destination. If the changed condition 220 indicates that bikes are no longer available for the user, a single transportation segment 218 may be generated corresponding to transportation by automobile to the user's final destination.

The server 202 may utilize the vehicle database 250 to perform one or more of generating the transportation route 204, identifying the changed condition 220, and/or generating the corrected transportation route 216. For example, the vehicle database 250 may be used to identify a changed condition 220 when vehicles move or otherwise become unavailable along the transportation route 204. As another example, the vehicle database 250 may be used to identify vehicles that are available and located near the transportation route 204 for potential use in fulfilling a new transportation segment 218 of the corrected transportation route 216.

The vehicle database 250 stores information regarding vehicles 254, 256, 258. The vehicle database 250 stores vehicles 254, 256, 258 in association with a modality 252 identifying the type of transportation provided by the vehicles 254, 256, 258. In particular, the modality 252 may include one or more of transportation by automobile, transportation by train, transportation by bus, transportation by personal mobility vehicle (e.g., bike and/or scooter), and transportation by walking. Modality 208 may include similar types of transportation. The vehicle database 250 may also store locations 260, 264 and availabilities 262, 266 for vehicles 254, 256. The locations 260, 264 may identify current locations for the corresponding vehicles 254, 256. For example, where the modality 252 is transportation by automobile, the locations 260, 264 may indicate a current location of the vehicles 254, 256 (e.g., the automobiles). In another example, where the modality 252 is transportation by docked bikes (e.g., bikes available for short-term rental between docks in fixed locations), the locations 260, 264 may indicate a current docked location of the vehicles 254, 256 (e.g., the bikes). In a further example, where the modality 252 is transportation by dockless bikes (e.g., bikes that are not required to be accessed from and/or returned to docks), the locations 260, 264 may indicate a current location of the vehicles 254, 256 (e.g., the bikes), such as where the bikes are located after use by a preceding user. The locations 260, 264 may also identify locations from which a user may access the vehicles 254, 256. For example, where the modality 252 is transportation by train, the locations 260, 264 may identify one or more train stations from which a user can board the vehicles 254, 256. As another example, where the modality 252 is transportation by bus, the locations 260, 264 may identify one or more bus stops from which a user can board the vehicles 254, 256. The availabilities 262, 266 may indicate whether a vehicle 254, 256 is currently available for use. For example, where the modality 252 is transportation by automobile, the availabilities 262, 266 may indicate whether the vehicles 254, 256 are available for passengers (e.g., whether the vehicle is currently providing transportation services and/or whether the vehicle has additional, vacant seats for additional passengers). As another example, where the modality 252 is transportation by scooter, the availabilities 262, 266 may indicate whether the corresponding vehicles 254, 256 are currently in use.

The server 202 may use the locations 260, 264 stored in association with the vehicles 254, 256 to identify the changed condition 220. For example, the server 202 may analyze the locations 260, 264 associated with the modality 252 of a transportation segment 206, 212, 214 to determine whether sufficient vehicles are located near a starting location of the transportation segment 206, 212, 214 to service the transportation segment 206, 212, 214. As a specific example, the server 202 may analyze the location 260, 264 associated with the modality 252 indicating the mode of transportation is by scooter. The server 202 may then determine that there are no scooters available to fulfill a transportation segment 206, 212, 214 of the transportation route 204. The server 202 may therefore determine that scooters are unavailable or unlikely to be able to fulfill the transportation segment 206, 212, 214.

The server 202 may also utilize the vehicle database 250 to generate the corrected transportation route 216. For example, the server 202 may analyze locations 260, 264 to identify modalities 252 with associated vehicles 254, 256 located near the transportation route 204 and/or capable of fulfilling transportation segments 218 that are newly-generated for the corrected transportation route 216. Continuing the previous example, after determining that transportation by scooter is unable to fulfill a transportation segment 206, 212, 214 of the transportation route 204, the server 202 may analyze locations 260, 264 of vehicles 254, 256 associated with a different modality 252 (e.g., transportation by automobile, transportation by bus) to determine whether there are sufficient vehicles 254, 256 associated with the different modality 252 to fulfill the transportation segment 218 generated for the corrected transportation route 216.

The vehicle database 250 may also store predicted locations 268 and predicted availabilities 270 in association with certain vehicles 258. The predicted locations 268 may indicate an expected future location of the corresponding vehicle 258. In certain implementations, the predicted location 268 may be identified based on previous trends for the vehicle 258, or for vehicles similar to the vehicle 258 (e.g., vehicles of the same modality 252 located in the same or similar location at a same or similar time as a vehicle 258). In other implementations, the predicted location 268 may be determined based on current information associated with the vehicle 258. For example, if the vehicle 258 is currently fulfilling all or part of the transportation request, the predicted location 268 may be determined based on a future location (e.g., a destination location) associated with the transportation request, such as a future location indicated by a transportation route (e.g., a transportation segment of the transportation route) associated with the transportation request. The predicted availability 270 may indicate an expected availability of the corresponding vehicle 258. The predicted availability 270 may be determined based on previous trends for the vehicle 258, previous trends for vehicles similar to the vehicle 258, or current route information associated with the vehicle 258, similar to the predicted location 268.

The server 202 may utilize predicted locations 268 and predicted availability 270 when identifying the changed condition 220 and/or when generating the corrected transportation route 216. In particular, the server 202 may utilize similar techniques to those discussed above in connection with the locations 260, 264. For example, rather than analyzing locations 260, 264 to identify the changed condition 220, the server 202 may additionally or alternatively analyze predicted locations 268. As another example, rather than generating new transportation segments 218 based on locations 260, 264, the server 202 may utilize predicted locations 268. For example, locations 260, 264 indicating the current location of vehicles 254, 256 may be useful for proactively identifying the changed condition 220 or generating transportation segments 218 to replace transportation segments that are currently in progress or will occur in the near future. However, such current location information may be less reliable in identifying changed conditions 220 or generating new transportation segments 218 for replacing transportation segments that occur later. In such examples, based on the predicted location 268 and/or predicted availability 270 of a vehicle 258, the server 202 may predict a likelihood that the vehicle 258 will be available to fulfill a future transportation segment 212, 214 of the transportation route 204. If the predicted likelihood is too low (e.g., is below a predetermined threshold), the server 202 may identify a changed condition 220 for the transportation route 204.

In certain implementations, the availabilities 262, 266 and predicted availabilities may be used to filter the locations 260, 264 and predicted locations 268. For example, when detecting the changed condition 220 and/or generating corrected transportation routes 216, the server 202 may disregard locations 260, 264 of vehicles 254, 256 whose availabilities 262, 266 indicate that the vehicle 254, 256 is in use and/or may disregard predicted locations 268 of vehicles 258 whose predicted availabilities 270 indicate that the vehicle 258 is likely to be in use.

The route database 230 stores transportation routes 232, 234. The transportation routes 232, 234 may correspond to transportation routes that are currently in progress and/or transportation routes that were previously completed. For example, the transportation routes 232, 234 may include multi-modal transportation routes that are in progress by users other than a user associated with the user device 240. In certain implementations, the server 202 may utilize the route database 230 to identify more than one transportation route 204, 232, 234 compromised by the changed condition 220 and/or to generate corrected transportation routes 216 for more than one transportation route 204, 232, 234.

The user database 280 may store information regarding user profiles 282 associated with one or more users (e.g., users submitting transportation requests 242). For example, the user database 280 may store user preferences 284 in association with user profiles 282. The user preferences 284 may specify, e.g., modality preferences regarding user (e.g., a user prefers one or more of transportation by automobile, transportation by train, transportation by bus, transportation by bike, transportation by scooter, transportation by walking other types of transportation). The user preferences 284 may also specify specific types of preferred transportation by users (e.g., transportation by shared automobile, transportation independent automobile).

Figure 3:
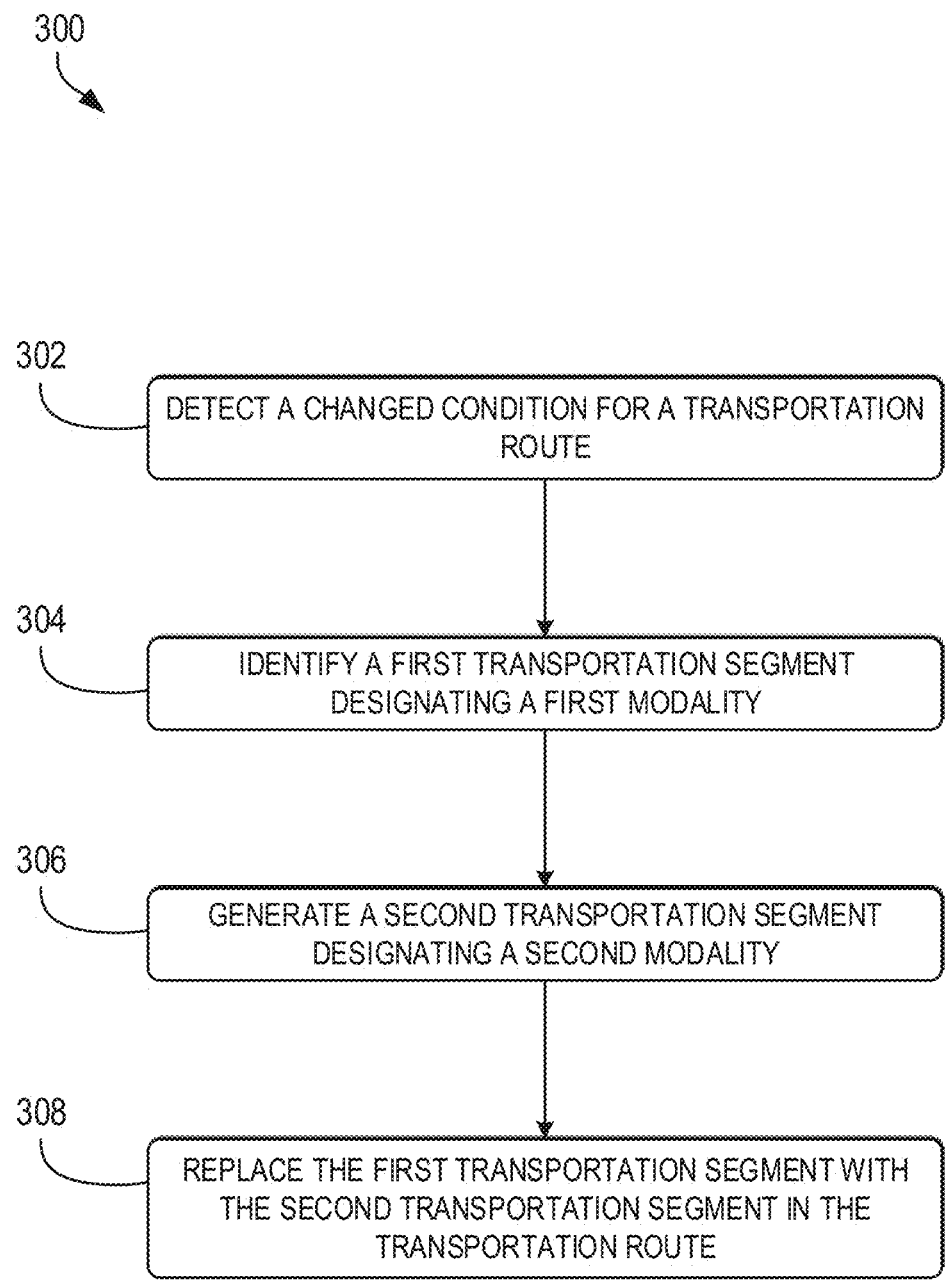
FIG. 3 illustrates a method according to an exemplary embodiment of the present disclosure.

FIG. 3 illustrates a method 300 according to an exemplary embodiment of the present disclosure. The method 300 may be performed to detect and respond to a changed condition 220 for transportation routes 204 with multiple transportation segments 206, 212, 214. The method 300 may be implemented on a computer system such as the system 200. For example, the method 300 may be implemented by the server 202, the user device 240, the vehicle database 250, the route database 230, and/or the user database 280. The method 300 may also be implemented by a set of instructions stored on a computer readable medium that, when executed by a processor, cause the computer system to perform the method 300. For example, all or part of the method 300 may be implemented by a processor and memory of the server 202, the user device 240, the vehicle database 250, the route database 230, and/or the user database 280. Although the examples below are discussed with reference to the flowchart illustrated in FIG. 3, many other methods of performing the acts associated with FIG. 3 may be used. For example, the order of some of the blocks may be changed, certain blocks may be combined with other blocks, one or more of the blocks may be repeated, and some of the blocks described may be optional.

The method 300 may begin with detecting a changed condition for a transportation route (block 302). For example, and referring to FIG. 2, the server 202 may detect a changed condition 220 for a transportation route 204 that is currently in progress. The changed condition 220 may reduce the likelihood that a transportation segments 206, 212, 214 will be successfully completed. For example, the changed condition 220 may reduce the likelihood that vehicles associated with a modality 208 of one or more of the transportation segments 206, 212, 214 will be available to service the transportation segments 206, 212, 214. In certain implementations, as described above, the changed condition 220 may be identified based on current conditions, including current locations 260, 264 and/or availabilities 262, 266 of vehicles 254, 256. In additional or alternative implementations, as also explained above, the changed condition 220 may be proactively identified based on future conditions, including predicted locations 268 and/or predicted availabilities 270 of vehicles 258.

In certain instances, detecting the changed condition 220 may include detecting that a current location 248 of the user device 240 associated with a transportation route 204 differs from an expected location of the user device 240. For example, the server 202 may compare the current location 248 of the user device 240 to a segment route 210 of the transportation segment 206 and may detect a changed condition if the current location 248 differs by more than a predetermined threshold distance from the segment route 210 (e.g., the user has deviated from the segment route 210). As another example, the server 202 may compare the current location 248 to an expected location along a segment route 210 based on a current time (e.g., how long a user has been using a certain modality). Even if the user is still following the segment route 210, a changed condition 220 may accordingly be detected if the user is ahead of the expected location or behind the expected location along the segment route 210. As a still further example, in addition to current location 248, the server 202 may receive or determine a speed of the user device 240 (e.g., a current speed of the user device, an average speed of the user device) and may compare the speed to an expected speed of the user device 240 based on the modality 208 of the current transportation segment 206. For example, if the user is moving at an average speed of 3 miles per hour, but the modality 208 indicates that user should be riding a bike, which may typically have a faster average speed of, e.g., 8-12 miles per hour. Based on the difference in average speed, the server 202 may determine a changed condition 220 indicating that the user is likely walking instead of riding a bike and/or that transportation by bike is slower than expected.

In other instances, detecting the changed condition may include detecting a change in availability of vehicles associated with a modality 208 of one or more of the transportation segments 206, 212, 214. For example, the server 202 may continuously analyze (e.g., at regular or predetermined times and/or intervals) locations 260, 264, predicted locations 268, availabilities 262, 266, and/or predicted availability 270 of vehicles associated with the modalities 252 of transportation segments 206, 212, 214 of the transportation route 204. The server 202 may then determine a number of vehicles of each modality available to fulfill transportation segments 206, 212, 214 with the same modality. For example, the server 202 may determine a number of vehicles 254, 256 with a location 260, 264 near a starting location of the transportation segment(s) associated with the same modality. As another example, the server 202 may determine a number of vehicles 254, 256 with a predicted location 268 near a starting location of the transportation segment(s) associated with the same modality. The server 202 may detect a changed condition 220 if there are insufficient vehicles available and/or located near a starting location of an associated transportation segment to fulfill the transportation segment. For example, the server 202 may also analyze transportation routes 232, 234 in the route database 230 to determine whether transportation routes 232, 234 other than the transportation route 204 include transportation segments associated with the same modality and similar starting location(s). If such transportation routes 232, 234 exist, the server 202 may compare a number of vehicles of the modality that are available near the starting location of the identified transportation segment with a number of transportation routes 232, 234 including transportation segments associated with the same modality and similar starting location(s). If there are insufficient vehicles available to fulfill all of the transportation routes 204, 232, 234, the server 202 may determine a changed condition 220. In additional or alternative implementations, the server 202 may compare the number of vehicles for a modality identified by a transportation segment that are available near a starting location of the transportation segment with a current demand (e.g., based on current marketplace conditions including current locations and/or availabilities) or an expected demand (e.g., demand expected based on previous transportation behavior of users and/or based on expected future marketplace conditions including predicted locations and/or availabilities) for vehicles near the starting location. If insufficient vehicles of the modality are available near the starting location to fulfill the transportation segment and the expected demand, the server 202 may detect a changed condition 220.

In still further instances, detecting the changed condition 220 may include detecting a change to an estimated time of completion of a transportation segment 206, 212, 214 of the transportation route 204. For example, as described above, the server 202 may compare the current location 248 of a user device 240 associated with the transportation route 204 to an expected location along the segment route 210 of a current transportation segment 206 (e.g., a transportation segment that is currently in progress). Based on the current location 248, the server 202 may calculate an expected time of completion for the current transportation segment 206. If the expected time of completion of a transportation segment 206 changes, the likelihood of successfully completing subsequent transportation segments 212, 214 may be reduced. For example, if the user is riding a scooter according to a transportation segment 206 to a train station to board a train according to a transportation segment 212 and the estimated time of completion changes to later than initially expected, the user may arrive after the train departs and may therefore miss the train. As another example, if the user is walking to a bike dock according to a transportation segment 206 to access a bike according to a transportation segment 212 and the estimated time of completion for the transportation segment 206 changes to later than initially expected, there may no longer be bikes available when the user arrives at the bike dock. Therefore, the server 202 may identify a changed condition 220 based on a change to the estimated time of completion of a transportation segment.

The server 202 may similarly identify a changed condition 220 based on an estimated time of departure associated with a vehicle of certain modalities. For example, a time of departure for a train from a transit station may be delayed. The delayed time of departure may compromise the successful completion of a later transportation segments (e.g., boarding another train or boarding a bus). As another example, a time of departure for a bus from a transit station may be earlier than expected. A transportation route with a later transportation segment associated with the bus may be compromised, e.g., because users in transportation to the transit stop may not arrive in time to board the bus. As a further example, a user may arrive at a transit station earlier than expected and may board an earlier bus or train than expected. The user's earlier time of departure from the transit station may change the vehicles available or expected to be available when the user disembarks the earlier bus or train, requiring an update to the user's transportation route.

Returning again to FIG. 3, a first transportation segment may be identified that designates a first modality (block 304). The first transportation segment may be identified as a transportation segment whose likelihood of successful completion is reduced by the changed condition. For example, the changed condition may decrease the likelihood that vehicles associated with the first modality will be available to service the first transportation segment. Referring to FIG. 2, the server 202 may identify the first transportation segment from among the transportation segments 206, 212, 214 of the transportation route 204. In certain implementations, the first transportation segment may be identified as a transportation segment of the transportation route 204 with a starting location near the changed condition 220. For example, the server 202 may monitor for a changed condition 220 (e.g., changes to vehicle availability, changes to estimated times of arrival and/or departure for vehicles) on an aggregate level. For example, the server 202 may track multiple transportation routes for multiple users that may be associated with multiple vehicles and/or multiple modalities in a given area. When one or more changed conditions 220 are identified, the server 202 may identify one or more transportation segments that are compromised by the changed condition 220 (i.e., the transportation segments may not be successfully completed due to the change conditions).

In some instances, the transportation segments whose successful completion is compromised may be identified differently depending on the changed condition 220. For example, the changed condition 220 may indicate that fewer vehicles are located in an area than necessary to meet current or expected demand for vehicles in the area. In such instances, the transportation segments compromised by the changed condition 220 may be identified as transportation segments designating the same modality with a starting location near the area with fewer vehicles. As another example, where the changed condition 220 is a delay to the estimated time of arrival of a vehicle at a location, the transportation segments may be identified as transportation segments that occur after completion of transportation segments associated with vehicles that have a delayed estimated time of arrival. In a still further example, where the changed condition 220 is an earlier time of departure for a vehicle from a location, the transportation segments may be identified as transportation segments associated with vehicles that have an earlier time of departure and associated with users that are not expected to arrive in time to board the vehicle before departure.

In additional or alternative implementations, the server 202 may analyze the changed condition 220 for individual transportation routes 204. For example, the server 202 may compare the current location 248 of a user device associated with a transportation route 204 to determine changes in expected times of completion of a transportation segment 206, 212, 214 of the transportation route and/or to determine whether the current location 248 deviates from an expected segment route 210. The server 202 may then identify the first transportation segment from among the transportation segments 206, 212, 214 of the transportation route that is compromised by the changed condition 220. For example, the current location 248 may differ from the segment route 210 of a transportation segment 206 if the user has deviated from an expected segment route. In such instances, the transportation segment 206 in progress at the time of the user's deviation may be identified as the first transportation segment compromised by the changed condition 220 because the likelihood of successful completion of the transportation segment 206 may be reduced as a result of the user's deviation (e.g., because the user may be unlikely to resume transportation along the segment route 210, or because it may take longer to do so). Subsequent transportation segments 212, 214 may additionally or alternatively identified as the first transportation segment. For example, if a user is biking to a first transit stop according to the transportation segment 206, but deviates from the segment route 210 and instead proceeds towards a second transit stop, successful completion of a subsequent transportation segment 212, 216 with a starting location at the first transit stop is unlikely. The subsequent transportation segment 212, 216 may therefore be identified as a first transportation segment whose successful completion is compromised. As another example, if the estimated time of completion of a transportation segment 206 that is currently in progress changes, transportation segments 212, 214 that occur after may be compromised, e.g., because the user may arrive after vehicles associated with the transportation segments 212, 214 may have departed by the time the user arrives and/or may no longer be available. Such subsequent transportation segments 212, 214 may accordingly be identified as the first transportation segment.

Returning to FIG. 3, a second transportation segment may then be generated designating a second modality (block 306). For example, and referring to FIG. 2, the server 202 may generate a transportation segment 218 to replace the first transportation segment in the transportation route 204. In certain implementations, the second transportation segment may be generated to designate a second modality that differs from the first modality of the first transportation segment. For example, where the first transportation segment designates transportation by train but is compromised because the estimated time of completion of a preceding transportation segment is after the train's estimated time of departure, the second transportation segment may be generated to designate transportation by automobile. In additional or alternative implementations, the second transportation segment may also be generated to have a different starting location and/or a different ending location than the first transportation segment. Continuing the previous example, the first transportation segment may begin at a transit station for the user to board a train and end at a second transit station for the user to disembark the train. Where the second modality is transportation by automobile, the second transportation segment may instead begin at a current location 248 associated with the transportation route, which may save a user time as the user no longer needs to walk to the first transit station since the user are no longer going to board the train.

In further implementations, the second transportation segment may be generated such that the second modality indicates the same type of transportation as the first modality. For example, where the first transportation segment designates transportation by train but is compromised because the estimated time of completion of a preceding transportation segment is after the train's estimated time of departure, the second transportation segment may be generated to designate transportation by a train that departs at a later time. Relatedly, the second transportation may, in certain implementations, be generated to have the same starting location and ending location as the first transportation segment. Continuing the previous example, the second transportation segment may be generated to direct a user to board a train at the same transit stop and disembark the train at the same transit stop as the first transportation segment, but at later times to account for the later estimated time of completion of the earlier transportation segment.

In certain implementations, the second transportation segment may be generated to account for user preferences 284 associated with a user profile 282 that is associated with the transportation route 204. For example, the user preferences 284 may specify that the user prefers transportation by automobile and dislikes transportation by bus. The second transportation segment may therefore be generated to include transportation by automobile and to not include transportation by bus where applicable. As another example, the user preferences 284 may specify that the user prefers transportation by shared automobile and dislikes transportation by automobile that is not shared. The second transportations segment may therefore be generated to include transportation by shared automobile where available.

Returning to FIG. 3, the first transportation segment may be replaced with the second transportation segment in the transportation route (block 308). For example, and referring to FIG. 2, the second transportation segment 218 may replace the first transportation segment 214 to generate a corrected transportation route 216. The corrected transportation route 216 may then be presented for display at the user device 240 for use by a user in navigating to their final destination. In certain implementations, the server 202 may generate multiple transportation segments at block 306. For example, the server 202 may generate transportation segments that utilize different types of modalities. In such instances, the server 202 may select one of the multiple transportation segments to replace the first transportation segment at block 308. The server 202 may select the transportation segment based on a reconciliation cost that compares the cost of completing a transportation route with the multiple transportation segments (e.g., completing a corrected transportation route including one or more of the multiple transportation segments) with the cost of completing the originally generated transportation route. For example, the server 202 may select a transportation segment from among the multiple transportation segments that results in a corrected transportation route 216 with a total cost that is closest to the initially-generated transportation route 204. In similar implementations, the server 202 may additionally or alternatively compare arrival times (e.g., may select the transportation segment that results in a corrected transportation route 216 with the closest arrival time) and/or travel times (e.g., may select the transportation segment that results in a corrected transportation route 216 with the closest total travel time). In still further implementations, the server 202 may transmit multiple corrected transportation routes 216 for selection by the user. During such an operation, the user device 240 may present a query requesting whether a user would prefer corrected transportation routes that are similar to the initially-generated route or would prefer corrected transportation routes that include different modalities and/or routes from the initially-generated transportation route and may select one or more corrected transportation routes that comply with a result of the query.

By performing the method 300, a server 202 may be able to continually update transportation routes 204 in response to changed conditions. Such changed conditions may be inherent to generating and executing on transportation routes with multiple modalities. Accordingly, by enabling the server 202 to detect and respond to changed conditions along transportation routes 204, the method 300 improves the ability of the server 202 to account for the changed conditions, thereby improving the robustness and usability of transportation routes 204 generated by the server 202, while also improving a user's ability to follow and comply with transportation routes 204 and/or corrected transportation routes 216.

In certain implementations, the method 300 may be performed to process multiple transportation routes 204 at the same time. For example, as explained regarding blocks 302 and 304, the server 202 may detect changed conditions on an aggregate basis and may identify transportation segments from multiple transportation routes whose likelihood of successful completion is reduced by the same changed condition 220. The server 202 may further generate transportation segments to replace such transportation segments in the aggregate. For example, the server 202 may generate the second transportation segment to replace a first subset of the transportation routes whose likelihood of successful completion is reduced by the changed condition 220 and may further generate a third transportation segment to replace a second subset of the transportation routes whose likelihood of successful completion is reduced by the changed condition 220. The third transportation segment may be generated with techniques similar to those used to generate the second transportation segment, but may designate a third modality different from the second modality. As a specific example, the server 202 may identify that there are 60 users on a train associated with transportation routes 204, 232, 234 that indicate the users will disembark the train at a transit stop and will begin riding scooters to their final destination. However, the server 202 may also determine (e.g., based on the vehicle database 250) that there are only 10 scooters available for use at the transit stop instead of the expected 60 scooters, compromising the completion of subsequent transportation segments for 50 of the users on the train. The server 202 may therefore generate a second transportation segment for 40 of the users designating transportation by automobile to their final destination and may generate a third transportation segment for 10 of the users designating transportation by bike to their final destination. In this way, the server 202 may be able to incorporate greater contextual information and can allocate transportation resources efficiently between multiple users whose transportation routes are compromised by changed conditions. Furthermore, the server 202 may also be able to better balance overall utilization of different modalities across a transportation system. For example, where a first modality has high demand and a second modality has low demand, the server 202 may balance the high demand by proposing more transportation segments that utilize the second modality to reduce demand for the first modality. To further foster user adoption of such recommendations, the server 202 may recommend alternative modalities according to user preferences (e.g., may recommend the second modality to users who have previously utilized the second modality).

Figure 4:
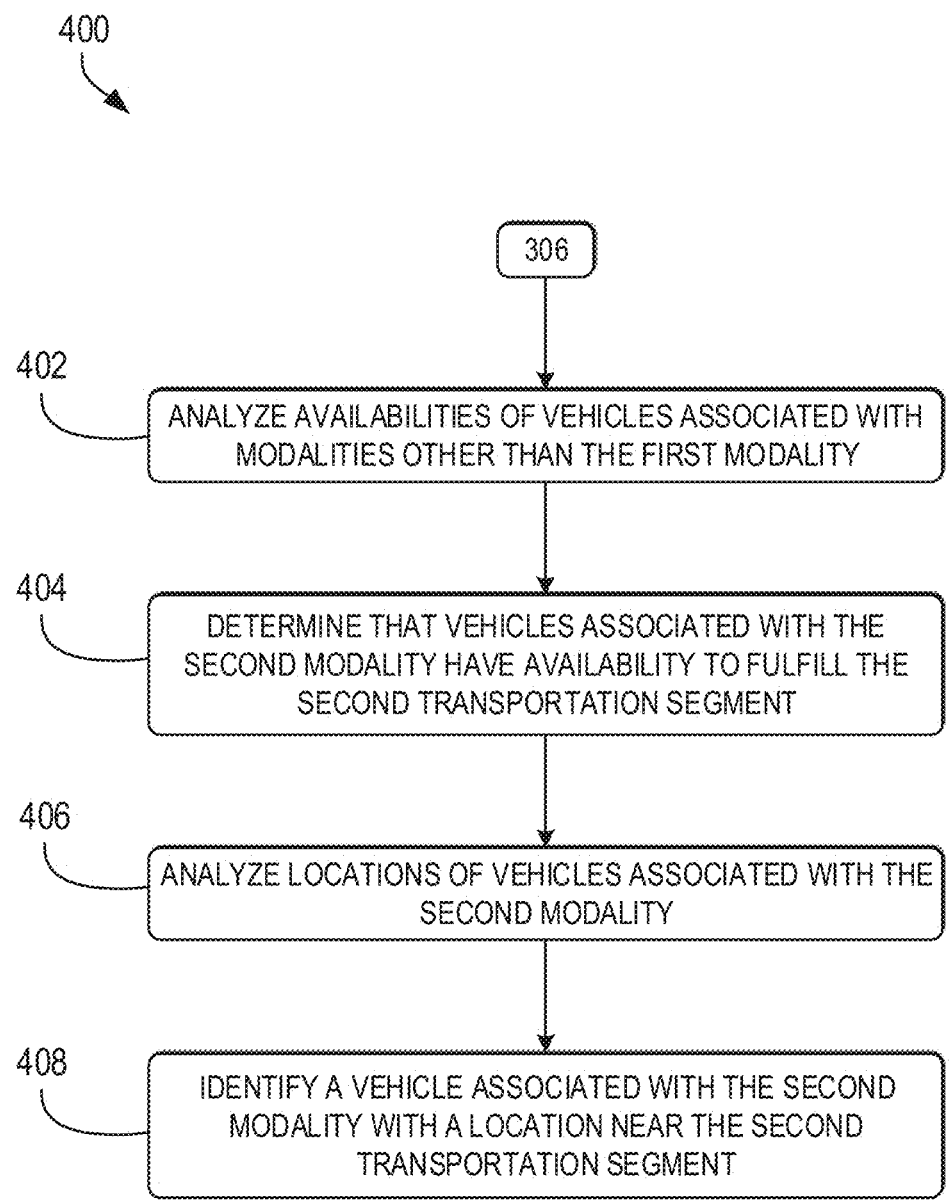
FIG. 4 illustrates a method according to an exemplary embodiment of the present disclosure.

FIG. 4 illustrates a method 400 according to an exemplary embodiment of the present disclosure. The method 400 may be performed to generate new transportation segments 218 for corrected transportation routes 216. For example, the method 400 may be performed to implement block 308 of the method 400. The method 400 may be implemented on a computer system such as the system 200. For example, the method 400 may be implemented by the server 202, the user device 240, the vehicle database 250, the route database 230, and/or the user database 280. The method 400 may also be implemented by a set of instructions stored on a computer readable medium that, when executed by a processor, cause the computer system to perform the method. For example, all or part of the method 400 may be implemented by a processor and memory of the server 202, the user device 240, the vehicle database 250, the route database 230, and/or the user database 280. Although the examples below are discussed with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 may begin with analyzing availabilities of vehicles associated with modalities other than the first modality (block 402). For example, and referring to FIGS. 2 and 3, the server 202 may analyze availabilities 262, 266 and predicted availabilities 270 of vehicles 254, 256, 258 associated with modalities 252 that are different than the first modality identified in block 304 of the method 300. Returning to FIG. 4, it may then be determined that vehicles associated with a second modality have sufficient availability to fulfill the second transportation request (block 404). For example, and referring to FIG. 2, the availabilities 262, 266 and/or predicted availabilities 270 may be compared to expected demand for vehicles 254, 256, 258 associated with the second modality. The server 202 may determine that vehicles associated with the second modality have sufficient availability if the availabilities 262, 266, 270 indicate that the number of available vehicles associated with the second modality exceeds the expected demand by a predetermined threshold. Accordingly, it may be determined that vehicles associated with the second modality can be used to provide transportation in lieu of the first modality compromised by the changed condition.

Returning to FIG. 4, locations of vehicles associated with the second modality may then be analyzed (block 406). For example, locations of vehicles that are available or expected to be available to fulfill the second transportation segment may be analyzed. In particular, and referring to FIG. 2, the server 202 may compare locations of available vehicles to a starting location of the first transportation segment and/or to a current location 248 of a user device 240 associated with the transportation route 204. Vehicles located near such locations (e.g., within a predetermined distance and/or predetermined travel time of such locations) may be identified as being able to fulfill the second transportation request. Returning to FIG. 4, a vehicle associated with the second modality may be identified with a location near the second transportation segment (block 408). For example, the vehicle may have a location near the starting location of the second transportation segment. The vehicle that is identified may therefore be available and located to fulfill the second transportation segment. Accordingly, the vehicle that is identified may be assigned to fulfill the second transportation segment. In alternative implementations, a vehicle may be identified with a location near the current location 248 of a user device 240 associated with the transportation route 204.

In certain implementations, blocks 402 and 406 may be combined and/or performed in parallel. For example, when analyzing the availabilities of vehicles associated with other modalities, the server 202 may limit the analysis to only analyze vehicles located near the second transportation segment and/or the current location 248. In additional or alternative implementations, one or more of the blocks 402, 404, 406, 408 may be omitted. For example, rather than analyzing availabilities of vehicles at blocks 402, 404, these blocks may be omitted. In such implementations, the method 400 may begin with analyzing locations of vehicles associated with the second modality at block 406.

Figure 5:
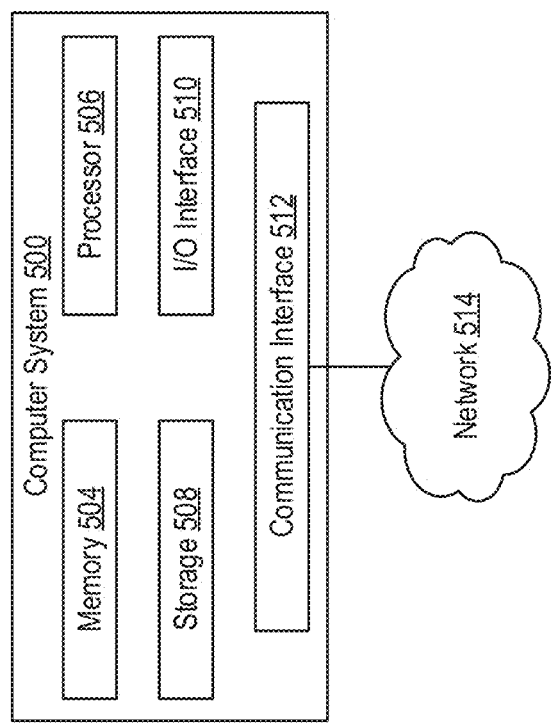
FIG. 5 illustrates a computer system according to an exemplary embodiment of the present disclosure.

FIG. 5 illustrates an example computer system 500 that may be utilized to implement one or more of the devices and/or components of FIG. 1A and/or FIG. 2, such as the transportation matching system, the server 202, the user device 240 and/or the vehicle database 250. In particular embodiments, one or more computer systems 500 perform one or more steps of one or more methods described or illustrated herein. In particular embodiments, one or more computer systems 500 provide the functionalities described or illustrated herein. In particular embodiments, software running on one or more computer systems 500 performs one or more steps of one or more methods described or illustrated herein or provides the functionalities described or illustrated herein. Particular embodiments include one or more portions of one or more computer systems 500. Herein, a reference to a computer system may encompass a computing device, and vice versa, where appropriate. Moreover, a reference to a computer system may encompass one or more computer systems, where appropriate.

This disclosure contemplates any suitable number of computer systems 500. This disclosure contemplates the computer system 500 taking any suitable physical form. As example and not by way of limitation, the computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 506, memory 504, storage 508, an input/output (I/O) interface 510, and a communication interface 512. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 506 includes hardware for executing instructions, such as those making up a computer program. As an example and not by way of limitation, to execute instructions, the processor 506 may retrieve (or fetch) the instructions from an internal register, an internal cache, memory 504, or storage 508; decode and execute the instructions; and then write one or more results to an internal register, internal cache, memory 504, or storage 508. In particular embodiments, the processor 506 may include one or more internal caches for data, instructions, or addresses. This disclosure contemplates the processor 506 including any suitable number of any suitable internal caches, where appropriate. As an example and not by way of limitation, the processor 506 may include one or more instruction caches, one or more data caches, and one or more translation lookaside buffers (TLBs). Instructions in the instruction caches may be copies of instructions in memory 504 or storage 508, and the instruction caches may speed up retrieval of those instructions by the processor 506. Data in the data caches may be copies of data in memory 504 or storage 508 that are to be operated on by computer instructions; the results of previous instructions executed by the processor 506 that are accessible to subsequent instructions or for writing to memory 504 or storage 508; or any other suitable data. The data caches may speed up read or write operations by the processor 506. The TLBs may speed up virtual-address translation for the processor 506. In particular embodiments, processor 506 may include one or more internal registers for data, instructions, or addresses. This disclosure contemplates the processor 506 including any suitable number of any suitable internal registers, where appropriate. Where appropriate, the processor 506 may include one or more arithmetic logic units (ALUs), be a multi-core processor, or include one or more processors 506. Although this disclosure describes and illustrates a particular processor, this disclosure contemplates any suitable processor.

In particular embodiments, the memory 504 includes main memory for storing instructions for the processor 506 to execute or data for processor 506 to operate on. As an example, and not by way of limitation, computer system 500 may load instructions from storage 508 or another source (such as another computer system 500) to the memory 504. The processor 506 may then load the instructions from the memory 504 to an internal register or internal cache. To execute the instructions, the processor 506 may retrieve the instructions from the internal register or internal cache and decode them. During or after execution of the instructions, the processor 506 may write one or more results (which may be intermediate or final results) to the internal register or internal cache. The processor 506 may then write one or more of those results to the memory 504. In particular embodiments, the processor 506 executes only instructions in one or more internal registers or internal caches or in memory 504 (as opposed to storage 508 or elsewhere) and operates only on data in one or more internal registers or internal caches or in memory 504 (as opposed to storage 508 or elsewhere). One or more memory buses (which may each include an address bus and a data bus) may couple the processor 506 to the memory 504. The bus may include one or more memory buses, as described in further detail below. In particular embodiments, one or more memory management units (MMUs) reside between the processor 506 and memory 504 and facilitate accesses to the memory 504 requested by the processor 506. In particular embodiments, the memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory implementations, this disclosure contemplates any suitable memory implementation.

In particular embodiments, the storage 508 includes mass storage for data or instructions. As an example and not by way of limitation, the storage 508 may include a hard disk drive (HDD), a floppy disk drive, flash memory, an optical disc, a magneto-optical disc, magnetic tape, or a Universal Serial Bus (USB) drive or a combination of two or more of these. The storage 508 may include removable or non-removable (or fixed) media, where appropriate. The storage 508 may be internal or external to computer system 500, where appropriate. In particular embodiments, the storage 508 is non-volatile, solid-state memory. In particular embodiments, the storage 508 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 508 taking any suitable physical form. The storage 508 may include one or more storage control units facilitating communication between processor 506 and storage 508, where appropriate. Where appropriate, the storage 508 may include one or more storages 508. Although this disclosure describes and illustrates particular storage, this disclosure contemplates any suitable storage.

In particular embodiments, the I/O Interface 510 includes hardware, software, or both, providing one or more interfaces for communication between computer system 500 and one or more I/O devices. The computer system 500 may include one or more of these I/O devices, where appropriate. One or more of these I/O devices may enable communication between a person and computer system 500. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 510 may include one or more device or software drivers enabling processor 506 to drive one or more of these I/O devices. The I/O interface 510 may include one or more I/O interfaces 510, where appropriate. Although this disclosure describes and illustrates a particular I/O interface, this disclosure contemplates any suitable I/O interface or combination of I/O interfaces.

In particular embodiments, communication interface 512 includes hardware, software, or both providing one or more interfaces for communication (such as, for example, packet-based communication) between computer system 500 and one or more other computer systems 500 or one or more networks 514. As an example and not by way of limitation, communication interface 512 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 514 and any suitable communication interface 512 for it. As an example and not by way of limitation, the network 514 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these. Computer system 500 may include any suitable communication interface 512 for any of these networks, where appropriate. Communication interface 512 may include one or more communication interfaces 512, where appropriate. Although this disclosure describes and illustrates a particular communication interface implementations, this disclosure contemplates any suitable communication interface implementation.

The computer system 502 may also include a bus. The bus may include hardware, software, or both and may communicatively couple the components of the computer system 500 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. The bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:
1. A system comprising:
a processor; and
a memory storing instructions which, when executed by the processor, cause the processor to:
   detect a changed condition for a current route that includes two or more segments and is associated with a computing device;

identify a first segment associated with a first modality from the two or more segment;

determine, in response to the changed condition and during the current route, a second segment associated with a second modality different than the first modality; and send, to the computing device, an updated route, wherein the updated route replaces the first segment with the second segment.

2. The system of claim 1, wherein the memory stores further instructions which, when executed by the processor while detecting the changed condition, cause the processor to detect that a current location of the computing device differs from an expected location for the computing device.

3. The system of claim 1, wherein the memory stores further instructions which, when executed by the processor while detecting the changed condition, cause the processor to detect a reduced availability for vehicles associated with the first modality.

4. The system of claim 1, wherein the memory stores further instructions which, when executed by the processor while detecting the changed condition, cause the processor to detect a change in an estimated time of completion of a current segment of the two or more segments.

5. The system of claim 1, wherein the memory stores further instructions which, when executed by the processor while determining the second segment, cause the processor to:

analyze locations of vehicles associated with the second modality; and identify a vehicle associated with the second modality with a location near the second segment.

6. The system of claim 1, wherein the first segment includes a first starting location and a first ending location, and wherein the second segment includes at least one of (i) a second starting location different from the first starting location and (ii) a second ending location different from the first ending location.

7. The system of claim 1, wherein the memory stores further instructions which, when executed by the processor while identifying the first segment, cause the processor to identify, based on the changed condition, multiple segments from multiple routes associated with the first modality, wherein the memory stores still further instructions which, when executed by the processor while determining the second segment, cause the processor to determine a third segment associated with a third modality different from the first modality and the second modality, and wherein the updated route replaces the first segment with the second segment and the third segment.

8. A method comprising:

detecting a changed condition for a current route that includes two or more segments and is associated with a computing device;

identifying a first segment associated with a first modality from the two or more segments;

determining, in response to the changed condition and during the current route, a second segment associated with a second modality different than the first modality; and sending, to the computing device, an updated route, wherein the updated route replaces the first segment with the second segment.

9. The method of claim 8, wherein detecting the changed condition further comprises detecting that a current location of the computing device differs from an expected location for the computing device.

10. The method of claim 8, wherein detecting the changed condition further comprises detecting a reduced availability for vehicles associated with the first modality.

11. The method of claim 8, wherein detecting the changed condition further comprises detecting a change in an estimated time of completion of a current segment of the two or more segments.

12. The method of claim 8, wherein determining the second segment further comprises:

analyzing locations of vehicles associated with the second modality; and identifying a vehicle associated with the second modality with a location near the second segment.

13. The method of claim 8, wherein the first segment includes a first starting location and a first ending location, and wherein the second segment includes at least one of (i) a second starting location different from the first starting location and (ii) a second ending location different from the first ending location.

14. The method of claim 8, wherein identifying the first segment further comprises identifying, based on the changed condition, multiple segments from multiple routes associated with the first modality, wherein determining the second segment further comprises determining a third segment associated with a third modality different from the first modality and the second modality, and wherein the updated route replaces the first segment with the second segment and the third segment.

15. A non-transitory, computer-readable medium storing instructions which, when executed by a processor, cause the processor to:

detect a changed condition for a current route that includes two or more segments and is associated with a computing device;

identify a first segment associated with a first modality from the two or more segments;

determine, in response to the changed condition and during the current route, a second segment associated with a second modality different than the first modality; and send, to the computing device, an updated route, wherein the updated route replaces the first segment with the second segment.

16. The non-transitory, computer-readable medium of claim 15, wherein the non-transitory, computer-readable medium stores further instructions which, when executed by the processor while detecting the changed condition, cause the processor to detect that a current location of the computing device differs from an expected location for the computing device.

17. The non-transitory, computer-readable medium of claim 15, wherein the non-transitory, computer-readable medium stores further instructions which, when executed by the processor while detecting the changed condition, cause the processor to detect a reduced availability for vehicles associated with the first modality.

18. The non-transitory, computer-readable medium of claim 15, wherein the non-transitory, computer-readable medium stores further instructions which, when executed by the processor while detecting the changed condition, cause the processor to detect a change in an estimated time of completion of a current segment of the two or more segments.

19. The non-transitory, computer-readable medium of claim 15, wherein the non-transitory, computer-readable medium stores further instructions which, when executed by the processor while determining the second segment, cause the processor to:
- analyze locations of vehicles associated with the second modality; and
- identify a vehicle associated with the second modality with a location near the second segment.

20. The non-transitory, computer-readable medium of claim 15, wherein the non-transitory, computer-readable medium stores further instructions which, when executed by the processor while identifying the first segment, cause the processor to identify, based on the changed condition, multiple segments from multiple routes associated with the first modality,
- wherein the non-transitory, computer-readable medium stores still further instructions which, when executed by the processor while determining the second segment, cause the processor to determine a third segment associated with a third modality different from the first modality and the second modality, and
- wherein the updated route replaces the first segment with the second segment and the third segment.

\* \* \* \* \*